(12) United States Patent
Myrhum, Jr. et al.

(10) Patent No.: US 10,940,521 B2
(45) Date of Patent: Mar. 9, 2021

(54) SWAGE TOOL

(71) Applicant: MILWAUKEE ELECTRIC TOOL CORPORATION, Brookfield, WI (US)

(72) Inventors: James O. Myrhum, Jr., West Bend, WI (US); Noah Z. Fang, Eden Prairie, MN (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 203 days.

(21) Appl. No.: 16/004,501

(22) Filed: Jun. 11, 2018

(65) Prior Publication Data
US 2019/0001393 A1 Jan. 3, 2019

Related U.S. Application Data

(60) Provisional application No. 62/526,487, filed on Jun. 29, 2017.

(51) Int. Cl.
*B21D 41/02* (2006.01)
*B21D 39/20* (2006.01)
*B21D 39/04* (2006.01)

(52) U.S. Cl.
CPC ........... *B21D 41/02* (2013.01); *B21D 39/046* (2013.01); *B21D 39/20* (2013.01); *B21D 41/026* (2013.01)

(58) Field of Classification Search
CPC .... B21D 41/02; B21D 41/026; B21D 41/028; B21D 41/00; B21D 39/08; B21D 39/20; B21D 39/00; B21D 31/04; B21D 41/025; B21D 41/021; B21D 41/023; B21D 19/08; B21D 19/10; B21D 19/16; B21D 17/00; B21D 17/02; B21D 13/00; B21D 13/10; B21D 13/04; B21D 15/00; B21D 15/02; B21D 15/04; B21K 1/54; B29C 57/02; B29C 57/04; B29C 57/08
USPC ...... 72/317, 370.06, 370.07, 370.08, 370.13, 72/393
See application file for complete search history.

(56) References Cited

U.S. PATENT DOCUMENTS

| | | | |
|---|---|---|---|
| 2,266,795 A | 12/1941 | Parker | |
| 2,266,796 A | 12/1941 | Parker | |
| 2,278,932 A | 4/1942 | Kellems | |
| 2,302,794 A * | 11/1942 | Neukirch | B21D 41/021 72/317 |
| 2,314,221 A | 3/1943 | Kellems | |
| 2,430,554 A | 11/1947 | Bugg et al. | |
| 2,604,139 A | 7/1952 | Franck | |

(Continued)

FOREIGN PATENT DOCUMENTS

| | | |
|---|---|---|
| CN | 2855577 | 1/2007 |
| CN | 101623738 | 1/2010 |

(Continued)

*Primary Examiner* — Teresa M Ekiert
*Assistant Examiner* — Sarkis A Aktavoukian
(74) *Attorney, Agent, or Firm* — Michael Best & Friedrich LLP

(57) ABSTRACT

A swage mechanism operable to expand an inner diameter of tubing. The swage mechanism includes a housing defining a longitudinal axis, a plurality of jaws coupled to the housing and movable relative to the longitudinal axis for selectively gripping the tubing, and a ram including a cylindrical portion and a frusto-conical head portion. The frusto-conical head portion of the ram is insertable into the tubing to expand the inner diameter of the tubing.

10 Claims, 7 Drawing Sheets

(56) References Cited

U.S. PATENT DOCUMENTS

| | | | |
|---|---|---|---|
| 2,620,013 A * | 12/1952 | De Voss | B21D 41/00 |
| | | | 72/306 |
| 2,711,576 A | 6/1955 | Wilson | |
| 2,711,771 A | 6/1955 | Wilson | |
| 2,711,773 A | 6/1955 | Wilson | |
| 2,711,774 A | 6/1955 | Wilson | |
| 2,737,225 A | 3/1956 | Jasinski | |
| 2,893,464 A | 7/1959 | Franck | |
| 2,932,338 A | 4/1960 | Franck | |
| 2,948,326 A | 8/1960 | Ingwer et al. | |
| 3,027,931 A | 4/1962 | Franck | |
| 3,050,103 A | 8/1962 | Janik | |
| 3,059,514 A | 10/1962 | Lindemann | |
| 3,584,344 A | 6/1971 | Bjalme | |
| 3,585,687 A | 6/1971 | Bjalme | |
| 3,601,852 A | 8/1971 | Bjalme | |
| 3,710,428 A | 1/1973 | Bjalme et al. | |
| 3,913,364 A | 10/1975 | Strybel | |
| 4,198,844 A | 4/1980 | Lowe et al. | |
| 4,308,736 A | 1/1982 | Lowe et al. | |
| 4,387,507 A | 6/1983 | Kelly | |
| 4,392,372 A | 7/1983 | Brodsky et al. | |
| 4,494,398 A | 1/1985 | Svoboda | |
| 4,567,631 A | 2/1986 | Kelly | |
| 4,745,678 A * | 5/1988 | Gray | B21C 37/24 |
| | | | 29/523 |
| 4,843,860 A | 7/1989 | Gray | |
| 6,062,060 A | 5/2000 | Nguyen | |
| 6,497,132 B1 | 12/2002 | Mackay et al. | |
| 6,508,097 B2 | 1/2003 | Ose | |
| 6,832,502 B1 | 12/2004 | Whyte et al. | |
| 6,928,732 B2 | 8/2005 | Sakai et al. | |
| 7,765,850 B2 | 8/2010 | Arita et al. | |
| 8,291,737 B2 | 10/2012 | Huang et al. | |
| 8,857,036 B2 | 10/2014 | Kuebel | |
| 2011/0151045 A1 * | 6/2011 | Gueit | B29C 57/04 |
| | | | 425/393 |
| 2013/0133394 A1 * | 5/2013 | Hasenberg | B21D 41/026 |
| | | | 72/312 |
| 2015/0114068 A1 * | 4/2015 | Hasenberg | B21D 41/021 |
| | | | 72/312 |
| 2016/0114440 A1 * | 4/2016 | Tanaka | B21D 41/02 |
| | | | 29/890.053 |

FOREIGN PATENT DOCUMENTS

| | | |
|---|---|---|
| CN | 201791849 | 4/2011 |
| CN | 203091567 | 7/2013 |
| DE | 202013103838 | 11/2013 |
| EP | 0284773 | 10/1988 |
| EP | 0689886 | 1/1996 |
| GB | 1524149 | 8/1985 |

* cited by examiner

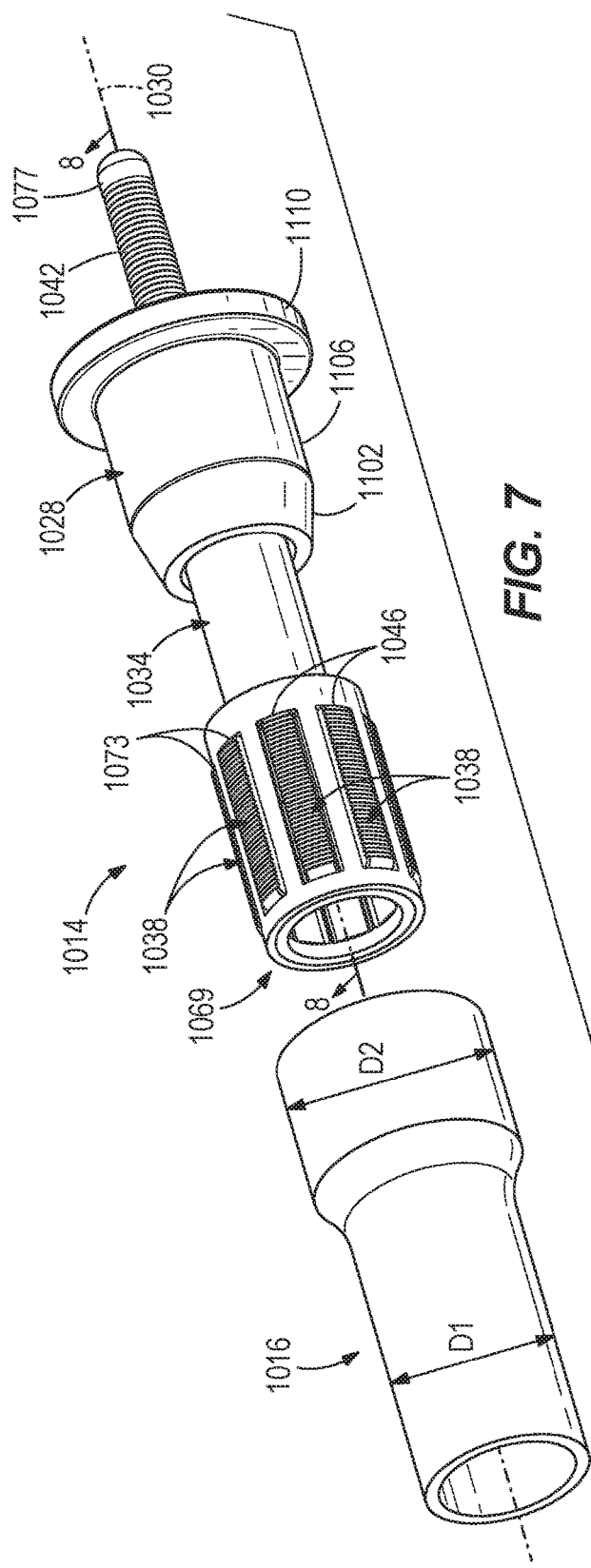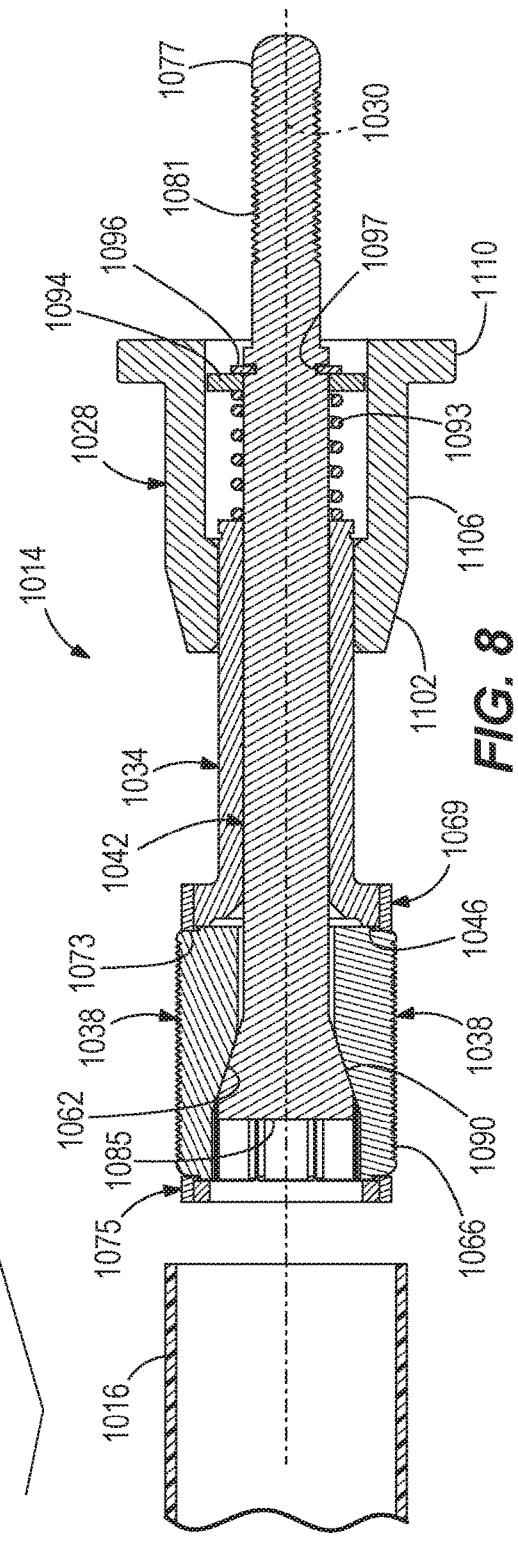

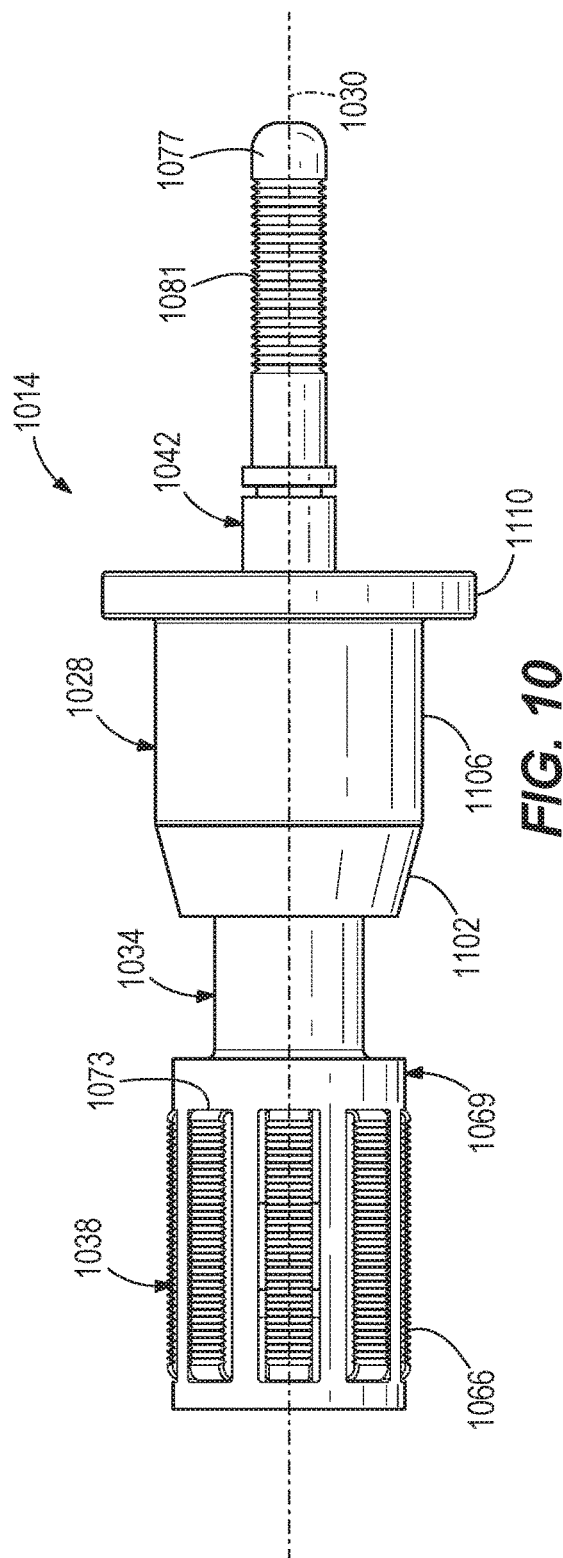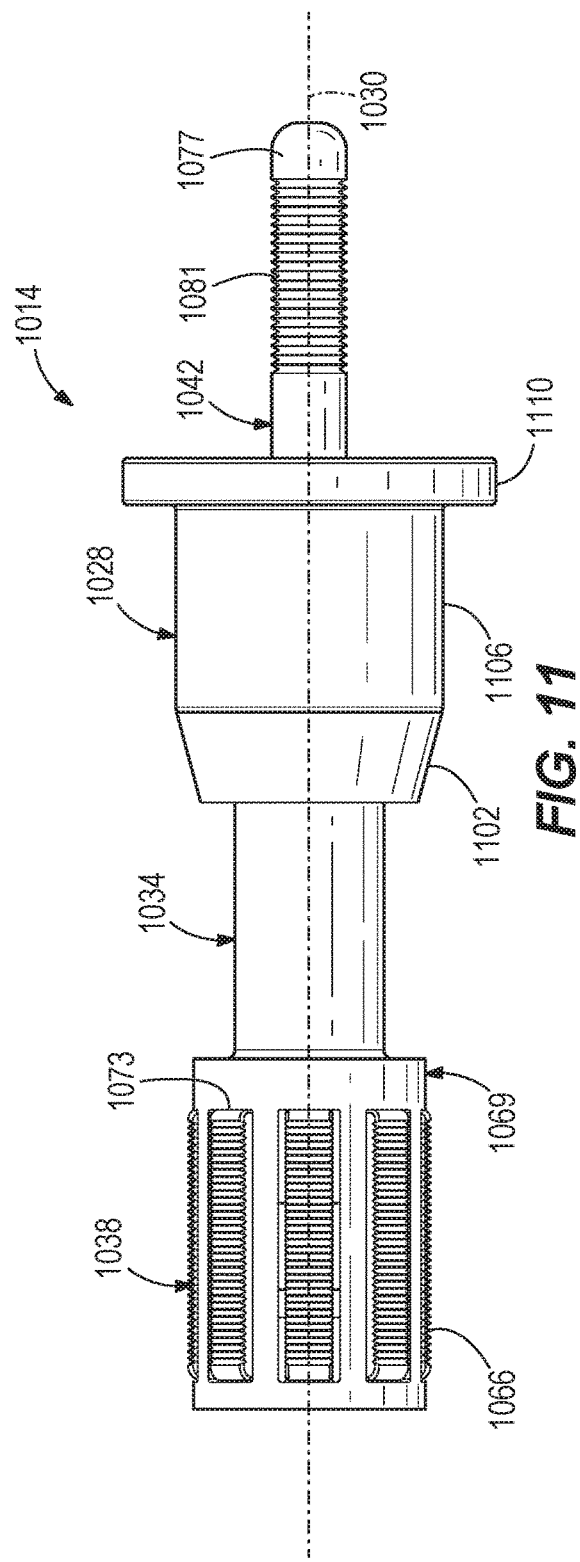

SWAGE TOOL

CROSS-REFERENCE TO RELATED APPLICATIONS

This application claims priority to U.S. Provisional Patent Application No. 62/526,487 filed on Jun. 29, 2017, the entire content of which is incorporated herein by reference.

FIELD OF THE INVENTION

The invention relates to power tools, and more particularly to swage tools.

BACKGROUND OF THE INVENTION

Swage tools are generally used for enlarging or "swaging" the diameter of a portion of tubing or piping. The process of swaging a tube or a pipe enables a subsequent tube or pipe to be inserted within the enlarged diameter end of the tube or pipe, thereby eliminating the need for a separate mechanical coupling for connecting two tubes or pipes together. In the case of metal tubing, the process of swaging a tube decreases the number of joints required to be welded from two joints (each interface between the mechanical coupling and the two pipes) to one joint.

SUMMARY OF THE INVENTION

The present invention provides, in one aspect, a swage mechanism operable to expand an inner diameter of tubing. The swage mechanism comprises a housing defining a longitudinal axis, a plurality of jaws coupled to the housing and movable relative to the longitudinal axis for selectively gripping the tubing, and a ram including a cylindrical portion and a frusto-conical head portion. The frusto-conical head portion of the ram is insertable into the tubing to expand the inner diameter of the tubing.

The present invention provides, in another aspect, a swage mechanism operable to expand an inner diameter of tubing. The swage mechanism comprises a housing defining a longitudinal axis and an arbor extending from the housing along the longitudinal axis. A first end of the arbor is graspable by a swaging tool. The swage mechanism further comprises a plurality of jaws coupled to the housing and movable radially outward relative to the longitudinal axis for selectively gripping an interior of the tubing, a wedge coupled to a second end of the arbor and in slidable contact with the plurality of jaws for moving the jaws radially outward relative to the longitudinal axis in response to movement of the arbor along the longitudinal axis away from the jaws, and a ram slidably mounted on the housing and having cylindrical portion and a frusto-conical head portion. The frusto-conical head portion of the ram is insertable into the tubing to expand the inner diameter of the tubing.

The present invention provides, in another aspect, a swage mechanism operable to expand an inner diameter of tubing. The swage mechanism comprises a housing defining a longitudinal axis and a plurality of jaws coupled to the housing and movable inward relative to the longitudinal axis for selectively gripping an exterior of the tubing. Each of the jaws has a first cam surface formed on an exterior thereof. The swage mechanism also comprises a sleeve disposed within the housing and having a second cam surface in slidable contact with the first cam surfaces of the respective jaws for moving the jaws toward or away from the longitudinal axis in response to movement of the sleeve along the longitudinal axis. The swage mechanism further comprises a ram movable along the longitudinal axis and having a cylindrical portion and a frusto-conical head portion. The frusto-conical head portion of the ram is insertable into the tubing to expand the inner diameter of the tubing.

Other features and aspects of the invention will become apparent by consideration of the following detailed description and accompanying drawings.

BRIEF DESCRIPTION OF THE DRAWINGS

FIG. 7 is a front perspective view of a swage mechanism in accordance with another embodiment of the invention.

FIG. 8 is a cross-sectional view of the swage mechanism along line 8-8 of FIG. 7.

FIG. 10 is side view of the swage mechanism of FIG. 7, illustrating the swage mechanism in a first configuration.

FIG. 11 is side plan view of the swage mechanism of FIG. 7, illustrating the swage mechanism in a second configuration.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
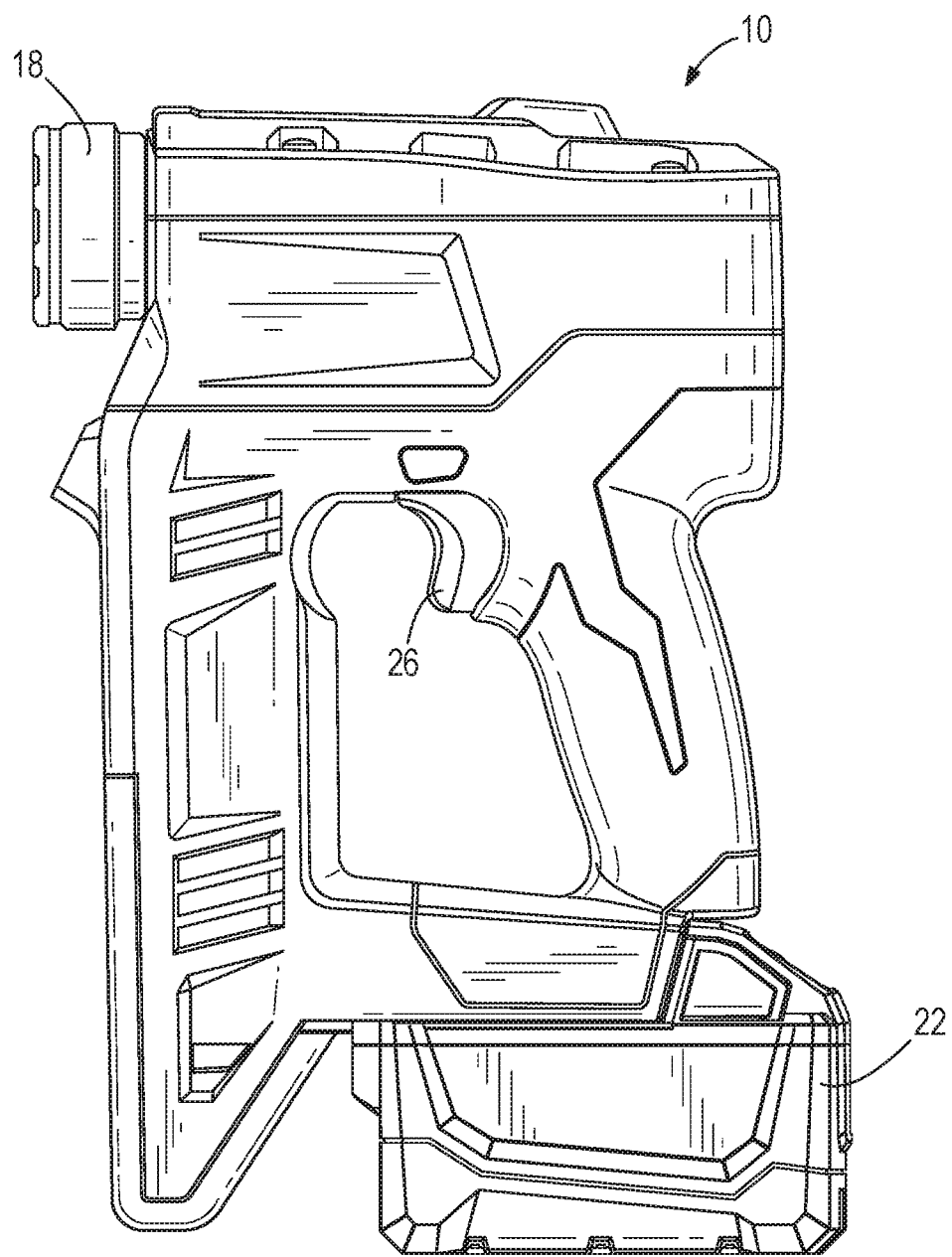
FIG. 1 illustrates a power tool with which a swage mechanism is usable.

FIG. 1 illustrates a power tool 10 (e.g., an expansion power tool, a power puller tool, etc.) that is operable to interface with a swage mechanism 14 (FIG. 2) for expanding the inner diameter of a workpiece 16 (e.g., a plastic tube, copper pipe, etc.). The power tool 10 includes a working end 18 that receives and operates the swage mechanism 14, as described in further detail below. The working end 18 is selectively driven by a power source 22 upon actuation of a trigger 26. In the illustrated embodiment, the power source 22 is a rechargeable lithium-ion battery. In other embodiments, the power tool 10 may include a power cord (not shown) for receiving electrical power from a power source, such as a wall outlet.

Figure 2:
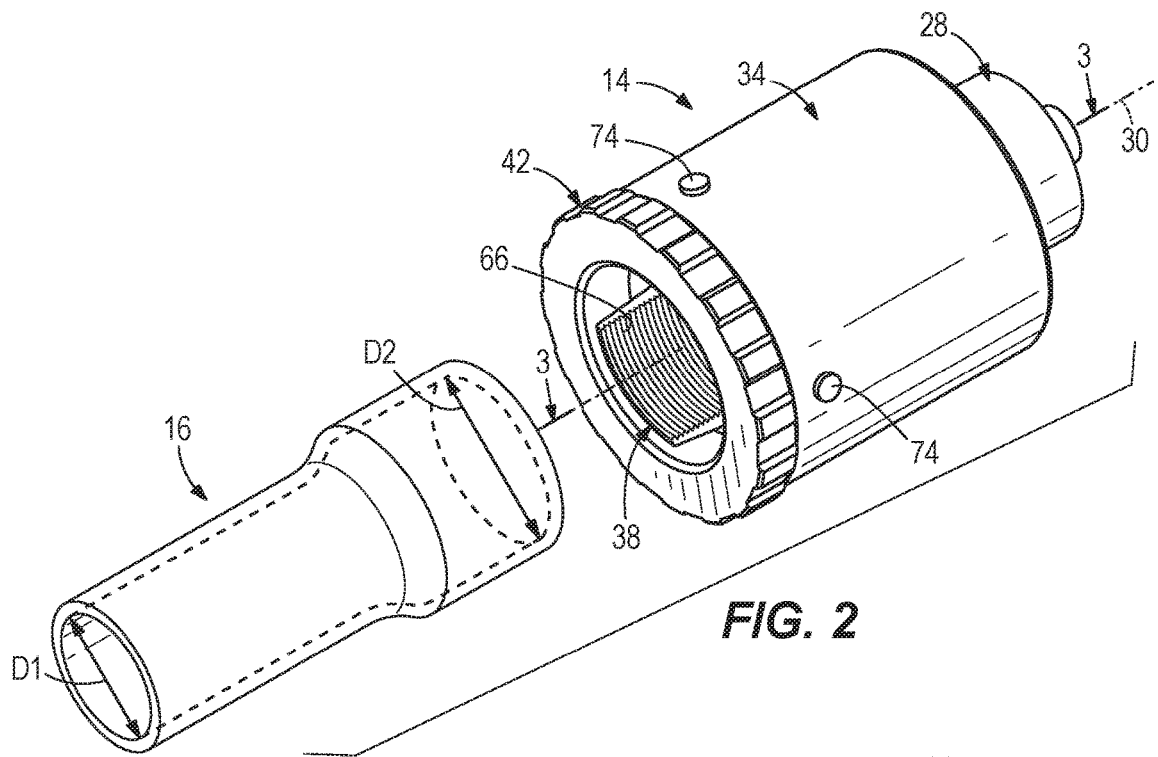
FIG. 2 is a front perspective view of a swage mechanism in accordance with an embodiment of the invention.
Figure 3:
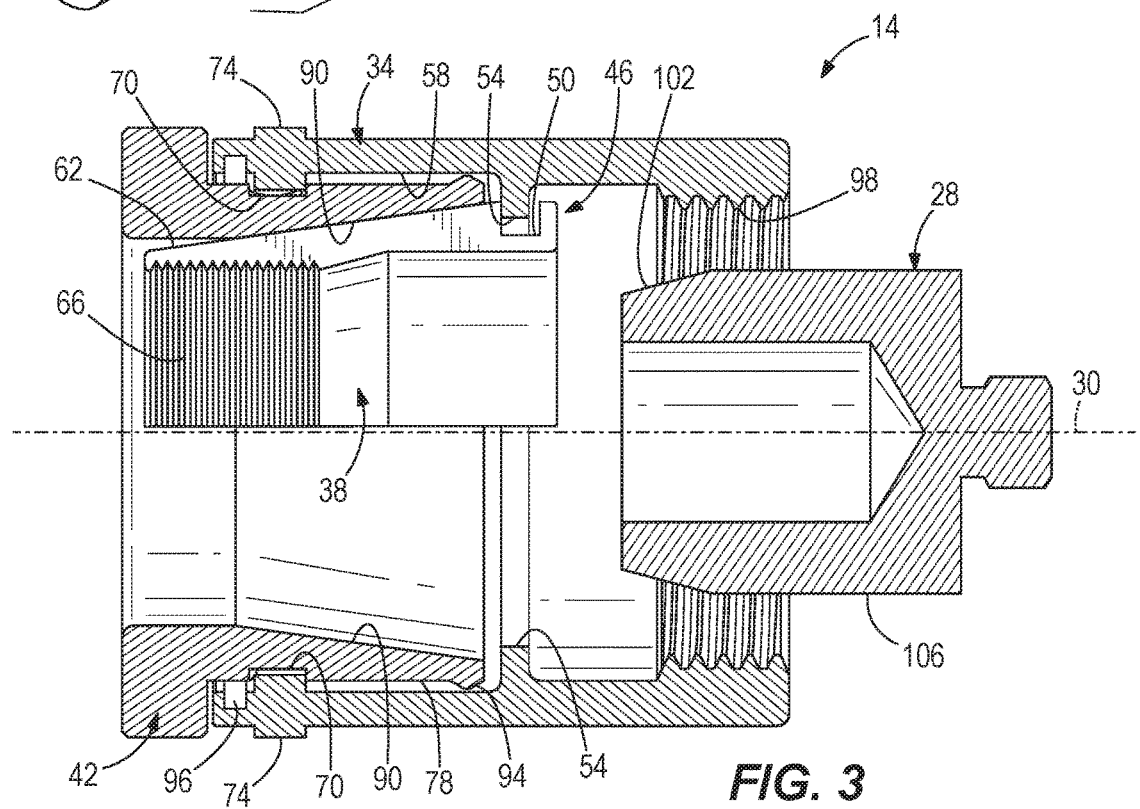
FIG. 3 is a cross-sectional view of the swage mechanism along line 3-3 of FIG. 2.

With reference to FIGS. 2 and 3, the swage mechanism 14 is operable to grab the exterior of the workpiece 16 and expand an original inner diameter D1 of the workpiece 16 to an expanded inner diameter D2 by pushing a ram 28 of the swage mechanism 14 into the interior of the workpiece 16. The swage mechanism 14 defines a longitudinal axis 30 along which the workpiece 16 is received. The swage mechanism 14 includes a housing 34, a plurality of jaws 38 coupled to the housing 34, and a sleeve 42 movably mounted to the housing 34. Although only a single jaw 38 is visible in FIGS. 2 and 3, the swage mechanism 14 includes four jaws 38 that are angularly spaced equally about the longitudinal axis 30. Each of the jaws 38 are independently movable relative to each other, and are each coupled to the housing 34 via a tongue-and-groove-type joint 46. Specifically, each of the jaws 38 includes an annular recess or groove 50 that receives an annular protrusion 54 extending away from an interior 58 of the housing 34 (FIG. 3). The tongue-and-groove-type joint 46 is relatively loose (i.e., has a permissible amount of slop) to allow the jaws 38 to essentially pivot about their associated protrusions 54. This allows the jaws 38 to diametrically expand and contract relative to the housing 34. Each of the jaws 38 further includes a first cam surface 62 and a plurality of teeth 66. The teeth 66 are configured to bite into the workpiece 16 in order to maintain a firm grasp of the workpiece 16 and inhibit relative movement between the jaws 38 and the workpiece 16.

Figure 4:
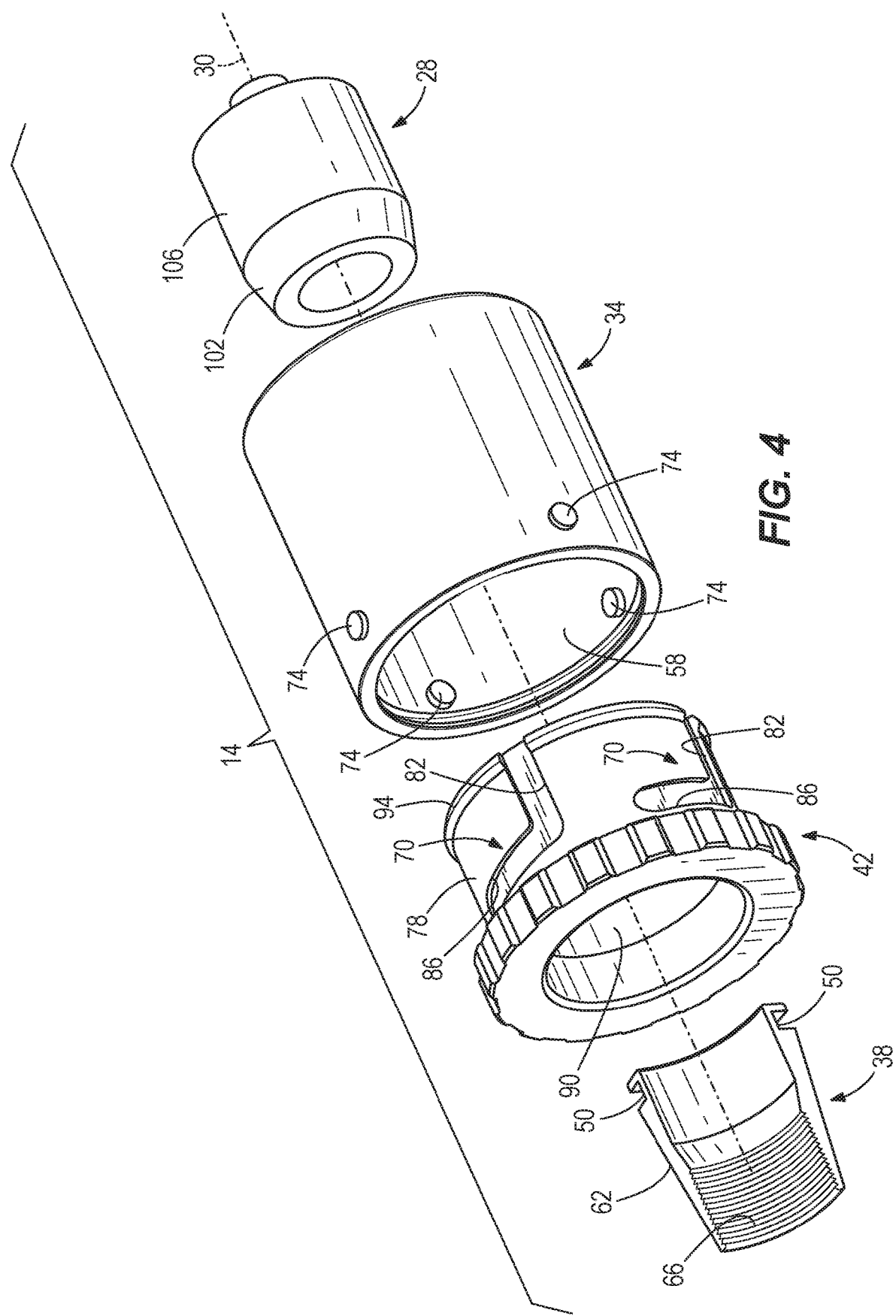
FIG. 4 is an exploded perspective view of the swage mechanism of FIG. 2.

With reference to FIGS. 3 and 4, the sleeve 42 of the swage mechanism 14 includes a plurality of grooves 70, each of which receives a corresponding radially inward-extending pin 74 on the housing 34 to rotatably and slidably interconnect the sleeve 42 to the housing 34. The grooves 70 are formed on an exterior 78 of the sleeve 42. The pins 74 extend away from the interior 58 of the housing toward the sleeve 42. There are a total four grooves 70 and four pins 74 in the illustrated embodiment. Each groove 70 includes a first segment 82 that extends parallel with the longitudinal axis 30 and a second segment 86 that extends along a helical path about the longitudinal axis 30. When the pin 74 slides within the first segment 82, the sleeve 42 slides in the direction of the longitudinal axis 30 relative to the housing 34 for coarsely adjusting the position of the sleeve 42 relative to the housing 34. In contrast, when the pin 74 slides within the second segment 86, the sleeve 42 rotates about the longitudinal axis 30 relative to the housing 34 for finely adjusting the position of the sleeve 42 relative to the housing 34. The sleeve 42 further includes a second cam surface 90 (FIG. 3) that is capable of interfacing with (i.e., sliding against) the first cam surface 62 of the jaws 38 to diametrically expand and contract the jaws 38.

The sleeve 42 further includes an annular protrusion 94 on the exterior 78 of the sleeve 42 that is capable of interacting with a snap ring 96 coupled to the housing 34 (FIG. 3). The annular protrusion 94 and the snap ring 96 have interfering diameters that effectively inhibit the sleeve 42 from uncoupling from the housing 34, as shown in FIG. 3.

Figure 5:
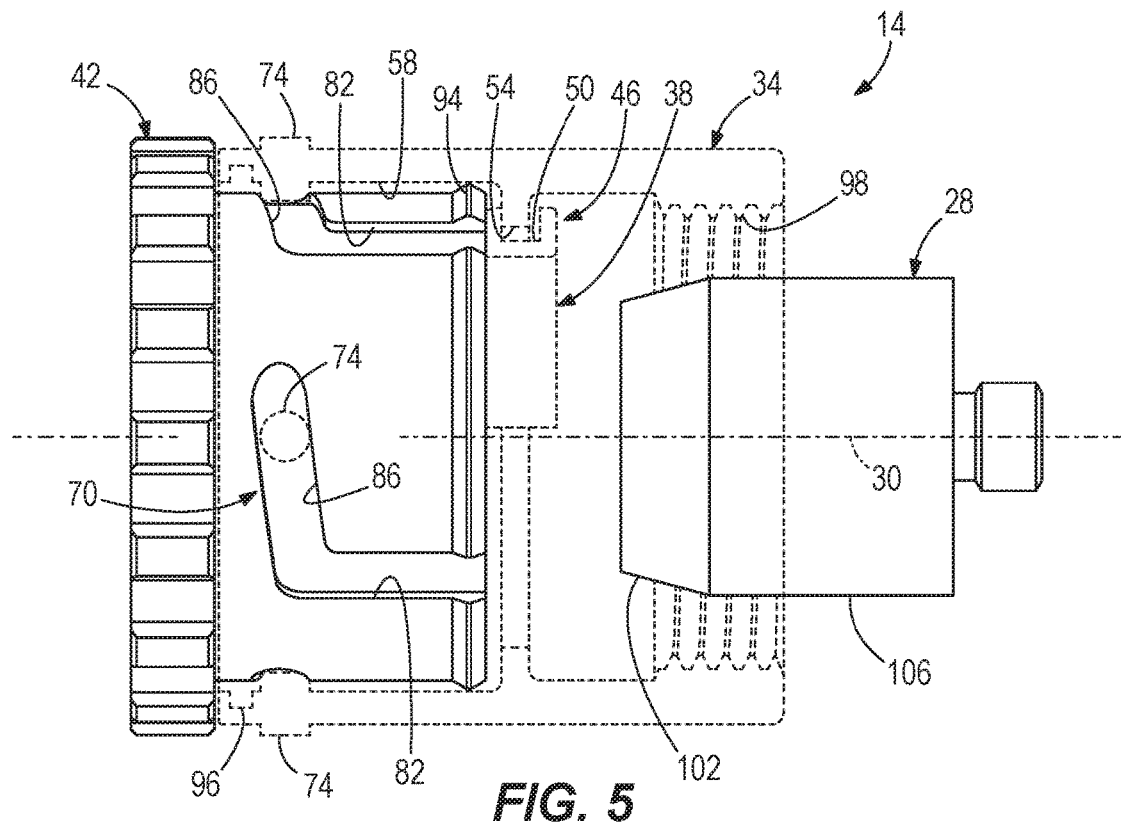
FIG. 5 is side view of the swage mechanism of FIG. 2, illustrating the swage mechanism in a first configuration.
Figure 6:
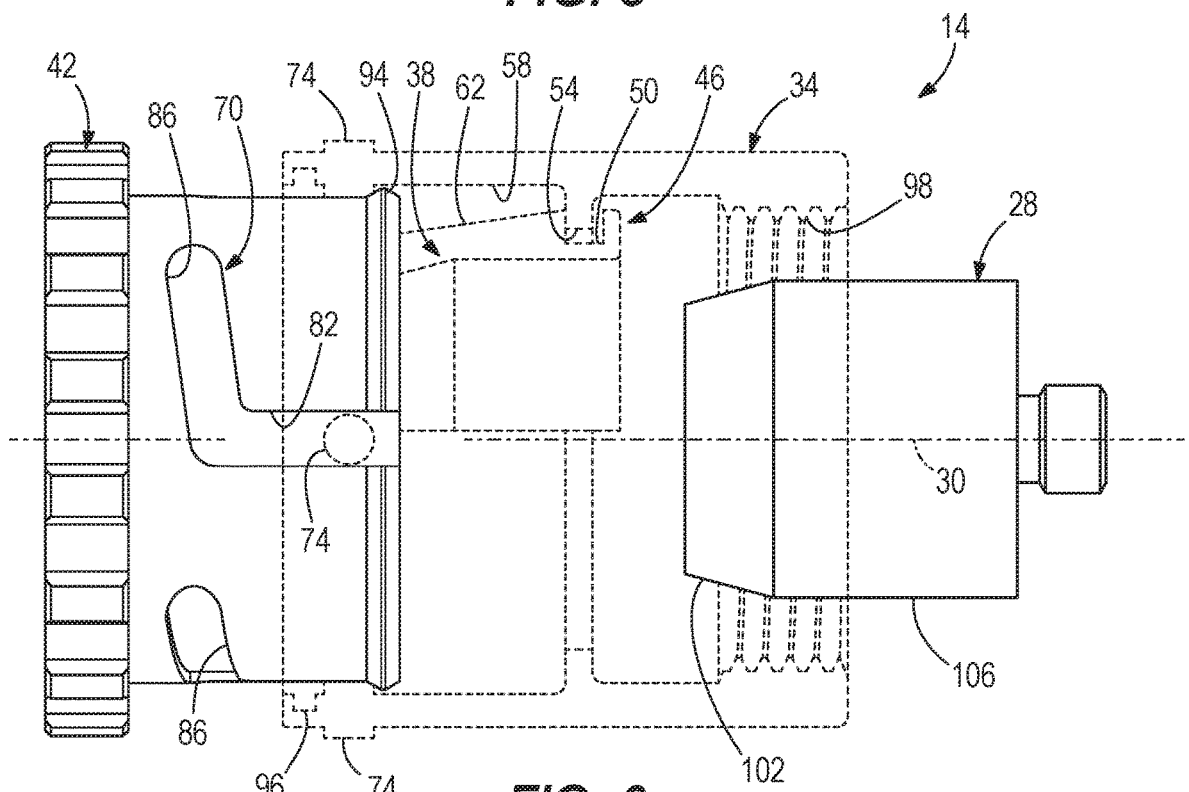
FIG. 6 is side view of the swage mechanism of FIG. 2, illustrating the swage mechanism in a second configuration.

With reference to FIGS. 5 and 6, the housing 34 of the swage mechanism 14 is threaded to the power tool 10 via a threaded region 98 on the interior of the housing 34. Also, the sleeve 42 is movable between a first position (FIG. 5) and a second position (FIG. 6), thereby adjusting the swage mechanism 14 between a first configuration and a second configuration respectively, for selectively clamping the swage mechanism 14 to the workpiece 16. Specifically, FIG. 5 illustrates the sleeve 42 in the first position, displacing and/or pivoting the jaws 38 inward toward the workpiece 16, whereas FIG. 6 illustrates the sleeve 42 in the second position, permitting the jaws 38 to be displaced and/or pivoted outward and away from the workpiece 16.

During operation, the swage mechanism 14 is attached to the working end 18 of power tool 10 via the threaded region 98 with the sleeve 42 in the second position (as shown in FIG. 6) awaiting insertion of the workpiece 16. In the second position, the jaws 38 are capable of being expanded diametrically outward to facilitate insertion of the workpiece 16. Upon receipt of the workpiece 16 between the jaws 38, the sleeve 42 is pushed toward the housing 34 and then rotated relative to the housing 34 as the pins 74 traverse within the respective segments 82, 86 of the grooves 70. As the sleeve 42 is moved from the second position to the first position, the second cam surface 90 slides against the first cam surface 62 of the jaws 38 to gradually contract the jaws 38 diametrically inward until the jaws 38 are firmly attached to the exterior of the workpiece 16. Coarse-longitudinal-adjustment of the jaws 38 occurs when the pins 74 traverse within the first segment 82 of the grooves 70, whereas fine-longitudinal-adjustment of the jaws 38 occurs when the pins 74 traverse within the second segment 86 of the grooves 70. Also, the sleeve 42 is maintained in the first position after the pins 74 traverse the entirety of the second segment 86, thereby locking the jaws 38 to the exterior of the workpiece 16. At this point, the power tool 10 is operated to push the ram 28 toward the workpiece 16 along the longitudinal axis 30. The ram 28 includes a frusto-conical head portion 102 at a distal end thereof and an adjacent cylindrical portion 106 that together are inserted into the workpiece 16 to form the expanded diameter D2. The frusto-conical head portion 102 is gradually tapered from a diameter slightly less than the original diameter D1 of the workpiece 16 to a diameter that is substantially equal to the expanded diameter D1 of the workpiece 16. The cylindrical portion 106 is also substantially equal to the expanded diameter D1 of the workpiece 16.

FIGS. 7-11 illustrate a swage mechanism 1014 in accordance with another embodiment of the invention. The swage mechanism 1014 grabs the interior of a workpiece 1016, but is otherwise similar to the swage mechanism 14 described above with reference to FIGS. 1-6, with like components being shown with like reference numerals plus 1000. Differences between the swage mechanisms 14, 1014 are described below.

Figure 9:
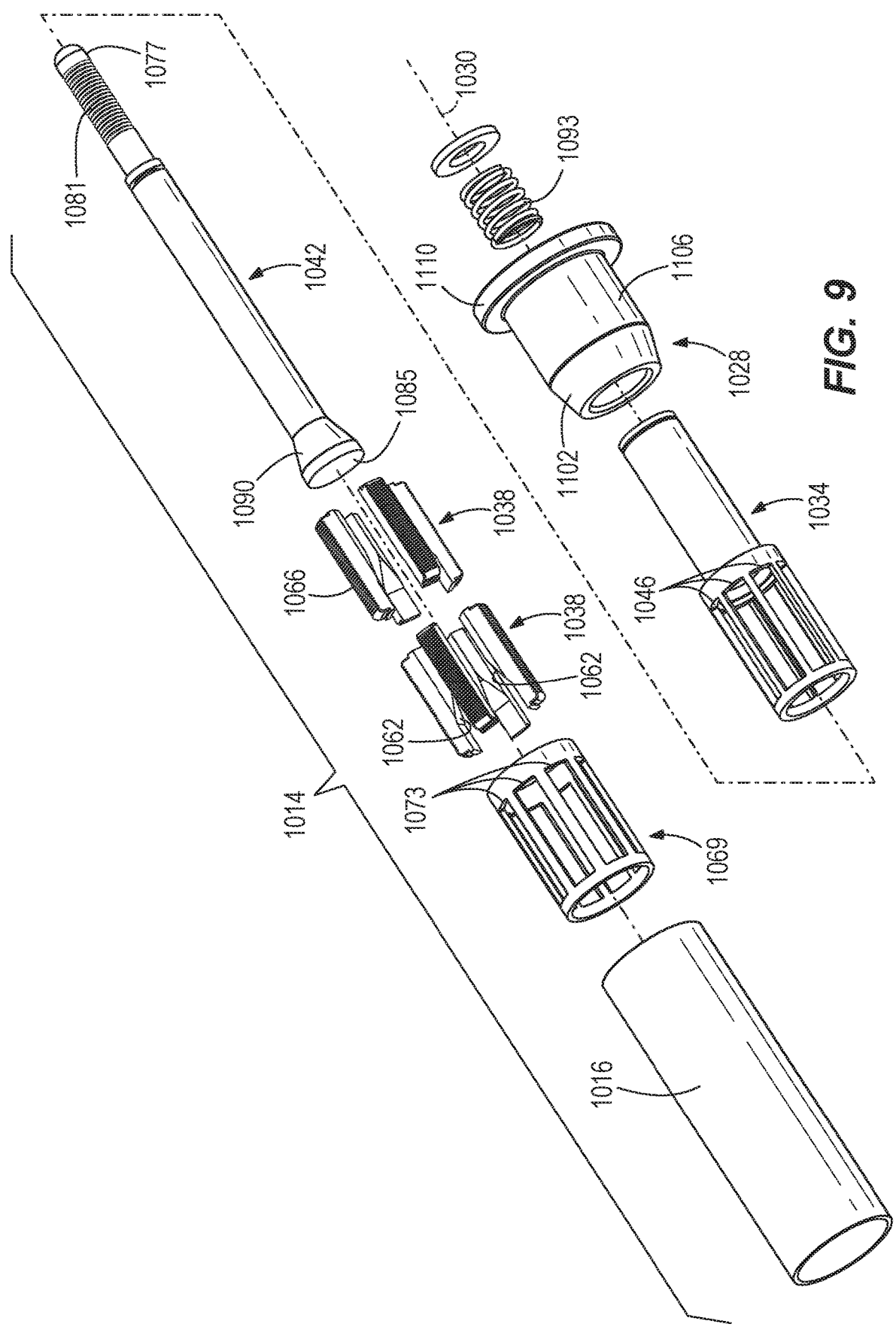
FIG. 9 is an exploded perspective view of the swage mechanism of FIG. 7.

With reference to FIGS. 7 and 8, the swage mechanism 1014 is operable to grab the interior of the workpiece 1016 and expand an original inner diameter D1 of the workpiece 1016 to an expanded inner diameter D2 by pushing a ram 1028 of the swage mechanism 1014 into the interior of the workpiece 1016. The swage mechanism 1014 defines a longitudinal axis 1030 along which the workpiece 1016 is received. The swage mechanism 1014 includes a housing 1034, a plurality of jaws 1038 coupled to the housing 1034, and an arbor 1042 movably mounted with the housing 1034. The jaws 1038 of the swage mechanism 1014 are angularly spaced equally about the longitudinal axis 1030. Each jaw 1038 is received within a corresponding radial aperture 1046 in the housing 1034 (FIG. 9). The illustrated embodiment of the swage mechanism 1014 includes eight jaws 1038; however, more or fewer may be used in other embodiments. Each of the jaws 1038 further includes a first cam surface 1062 and a plurality of teeth 1066 (FIG. 8). The teeth 1066 are configured to bite into the workpiece 1016 in order to maintain a firm grasp of the workpiece 1016 and inhibit relative movement between the jaws 1038 and the workpiece 1016.

With reference to FIGS. 8 and 9, swage mechanism 1014 further includes cap 1069 having a plurality of apertures 1073. The apertures 1073 allow the jaws 1038 to extend through the cap 1069. However, the cap 1069 inhibits the jaws 1038 from being removed from the housing 1034 in a radially outward direction because the apertures 1073 in the cap 1069 are slightly smaller than the apertures 1046 in the housing 1034. Consequently, the smaller apertures 1073 in the cap 1069 limit the amount of radially outward movement of the jaws 1038 relative to the housing 1034. This slight variation of size between the apertures 1046, 1073 forms a shoulder 1075 (best illustrated in FIG. 8) that limits the extent to which the jaws 1038 are movable radially outward. As such, the jaws 1038 are retained to the housing 1034.

With reference to FIGS. 8 and 9, the arbor 1042 includes a first end 1077 that extends away from the housing 1034 and is receivable by the working end 18 of the power tool 10. The first end 1077 includes a ribbed surface 1081 to enhance the connection between the working end 18 of the tool 10 and the first end 1077 of the arbor 1042. At a second end 1085 of the arbor 1042, the arbor 1042 includes a wedge defining a second cam surface 1090 that is capable of interfacing with (i.e., sliding against) the first cam surface 1062 of the jaws 1038 to diametrically expand and contract the jaws 1038.

With reference to FIGS. 10 and 11, the arbor 1042 is movable between a first position (FIG. 10) and a second position (FIG. 11), thereby adjusting the swage mechanism 1014 between a first configuration and a second configuration respectively, for selectively clamping the swage mechanism 14 to the workpiece 1016 and forming the expanded diameter D2 of the workpiece 1016. Specifically, FIG. 10 illustrates the arbor 1042 in the first position, displacing the jaws 1038 outward toward the interior of the workpiece 1016 and the ram 1028 is inserted into the workpiece 1016, whereas FIG. 11 illustrates the arbor 1042 in the second position, permitting the jaws 1038 to be displaced inward into the housing 1034 and away from the interior of the workpiece 1016, with the ram 1028 being spaced from the workpiece 1016. The arbor 1042 is biased toward the second position by a biasing member (e.g., a compression spring 1093). The spring 1093 is disposed within the ram 1028 between a distal end of the housing 1034 and a washer 1094, as shown in FIG. 8. The washer 1094 is retained around the arbor 1042 by a retaining ring 1096 that sits within a groove 1097. The ram 1028 includes a frusto-conical head portion 1102 and a cylindrical portion 1106 that together are inserted into the workpiece 1016 in the second position to form the expanded diameter D2. The frusto-conical head portion 1102 is gradually tapered from a diameter slightly less than the original diameter D1 of the workpiece 1016 to a diameter that is substantially equal to the expanded diameter D1 of the workpiece 1016. The cylindrical portion 1106 is also substantially equal to the expanded diameter D1 of the workpiece 1016. The ram 1028 further includes a flange 1110 that flares radially outward from the cylindrical portion 1106. The flange 1110 limits the extent to which the ram 1028 may be inserted into the workpiece 1016.

During operation, the swage mechanism 1014 is attached to the working end 1018 of power tool 10 via the first end 1077 of the arbor 1042 with the arbor 1042 in the second position (FIG. 11). At this point, the workpiece 1016 receives the swage mechanism 1014 until the workpiece 1016 abuts the frusto-conical head portion 1102 of the ram 1028. Upon receipt of the workpiece 1016, the arbor 1042 is moved toward the first position (FIG. 10) via actuation of the trigger 26 of the power tool 10. In response to the arbor 1042 moving from the second position to the first position, the second cam surface 1090 of the arbor 1042 slides against the first cam surface 1062 of the jaws 1038 to gradually expand the jaws 1038 diametrically outward until the jaws 1038 are firmly coupled to the interior of the workpiece 1016. Once the jaws 1038 can no longer move radially outward, the housing 1034 (and therefore the jaws 1038 and the workpiece 1016) move in a direction toward the ram 1028 along the longitudinal axis 1030. The arbor 1042 is continually pulled by the power tool 10 to pull the workpiece 1016 over the entirety of the frusto-conical head portion 1102 and the cylindrical portion 1106 to effectively swage the workpiece 1016 to the desired expanded diameter D2. Once the workpiece 1016 abuts the flange 1110 of the ram 1028, the swaging process of the workpiece 1016 is complete and the workpiece 1016 can be removed from the swage mechanism 1014.

Various features of the invention are set forth in the following claims.

What is claimed is:

1. A swage mechanism operable to expand an inner diameter of tubing, the swage mechanism comprising:
    a housing defining a longitudinal axis;
    a plurality of jaws coupled to the housing and movable relative to the longitudinal axis for selectively gripping the tubing, wherein the jaws each include a first cam surface;
    a ram including a cylindrical portion and a frusto-conical head portion, wherein the frusto-conical head portion of the ram is insertable into the tubing to expand the inner diameter of the tubing; and
    a body coupled to the housing and having a second cam surface;
    wherein the second cam surface of the body is engageable with the first cam surface of each of the jaws to move the jaws toward or away from the longitudinal axis, wherein the jaws are moved when the second cam surface is moved in a direction along the longitudinal axis and the jaws are moved when the second cam surface is rotated around the longitudinal axis.

2. The swage mechanism of claim 1, wherein the body is movable in a direction along the longitudinal axis between a first position, in which the jaws are displaced toward the tubing, and a second position, in which the jaws are permitted to be displaced away from the tubing.

3. The swage mechanism of claim 1, wherein the jaws each include teeth that are capable of biting into the tubing to inhibit the tubing from moving relative to the jaws.

4. The swage mechanism of claim 1, wherein the jaws are pivotable relative to the housing or radially movable relative to the housing to diametrically expand and retract.

5. A swage mechanism operable to expand an inner diameter of tubing, the swage mechanism comprising:
    a housing defining a longitudinal axis;
    a plurality of jaws coupled to the housing and movable inward relative to the longitudinal axis for selectively gripping an exterior of the tubing, each of the jaws having a first cam surface formed on an exterior thereof;
    a sleeve disposed within the housing and having a second cam surface in slidable contact with the first cam surfaces of the respective jaws for moving the jaws toward or away from the longitudinal axis in response to movement of the sleeve along the longitudinal axis; and
    a ram movable along the longitudinal axis and having a cylindrical portion and a frusto-conical head portion, wherein the frusto-conical head portion of the ram is insertable into the tubing to expand the inner diameter of the tubing,
    wherein the sleeve includes a plurality of grooves, each of which receives a corresponding radially inward-extending pin on the housing to rotatably and slidably interconnect the sleeve to the housing.

6. The swage mechanism of claim 5, wherein the sleeve is movable in a direction along the longitudinal axis between a first position, in which the second cam surface of the sleeve moves the jaws inward toward the tubing, and a second position, in which the jaws are permitted to be moved outward and away from the tubing.

7. The swage mechanism of claim 5, wherein the jaws each include teeth that are capable of biting into the exterior of the tubing to inhibit the tubing from moving relative to the jaws.

8. The swage mechanism of claim 5, wherein each groove includes a first segment that extends parallel with the longitudinal axis and a second segment that extends along a helical path about the longitudinal axis.

9. The swage mechanism of claim 8, wherein the pins slide within the first segments of the respective grooves for coarse adjustment of the jaws relative to the housing.

10. The swage mechanism of claim 9, wherein the pins slide within the second segments of the respective grooves for fine adjustment of the jaws relative to the housing.

* * * * *